US00RE49734E

(19) United States
(12) Reissued Patent
Graykowski et al.

(10) Patent Number: US RE49,734 E
(45) Date of Reissued Patent: Nov. 28, 2023

(54) PRY BAR

(71) Applicant: MILWAUKEE ELECTRIC TOOL CORPORATION, Brookfield, WI (US)

(72) Inventors: Anthony S. Graykowski, Belgium, WI (US); Joseph M. DeBaker, Greenfield, WI (US)

(73) Assignee: Milwaukee Electric Tool Corporation, Brookfield, WI (US)

(21) Appl. No.: 29/662,005

(22) Filed: Aug. 31, 2018

Related U.S. Patent Documents

Reissue of:
(64) Patent No.: Des. 821,843
Issued: Jul. 3, 2018
Appl. No.: 29/590,661
Filed: Jan. 12, 2017

(51) LOC (14) Cl. ..... 08-05
(52) U.S. Cl.
USPC ..... D8/89
(58) Field of Classification Search
USPC ..... D8/14, 88, 89, 105, 82, 83
(Continued)

(56) References Cited

U.S. PATENT DOCUMENTS 2,026,581 A 1/1936 Lane
D197,205 S 12/1963 Estwing
(Continued)

FOREIGN PATENT DOCUMENTS

FR 1286757 3/1962
FR 2220352 10/1974

*Primary Examiner* — Philip S Hyder
(74) *Attorney, Agent, or Firm* — Michael Best & Friedrich LLP

(57) CLAIM

We claim the ornamental design for a pry bar, as shown and described.

DESCRIPTION

*This document is a reissue of U.S. Design Pat. No. D. 821,843, which granted on Jul. 3, 2018, from U.S. Design patent application Ser. No. 29/590,661, filed on Jan. 12, 2017, the entire contents of which are hereby incorporated by reference herein.*

Figure 1:
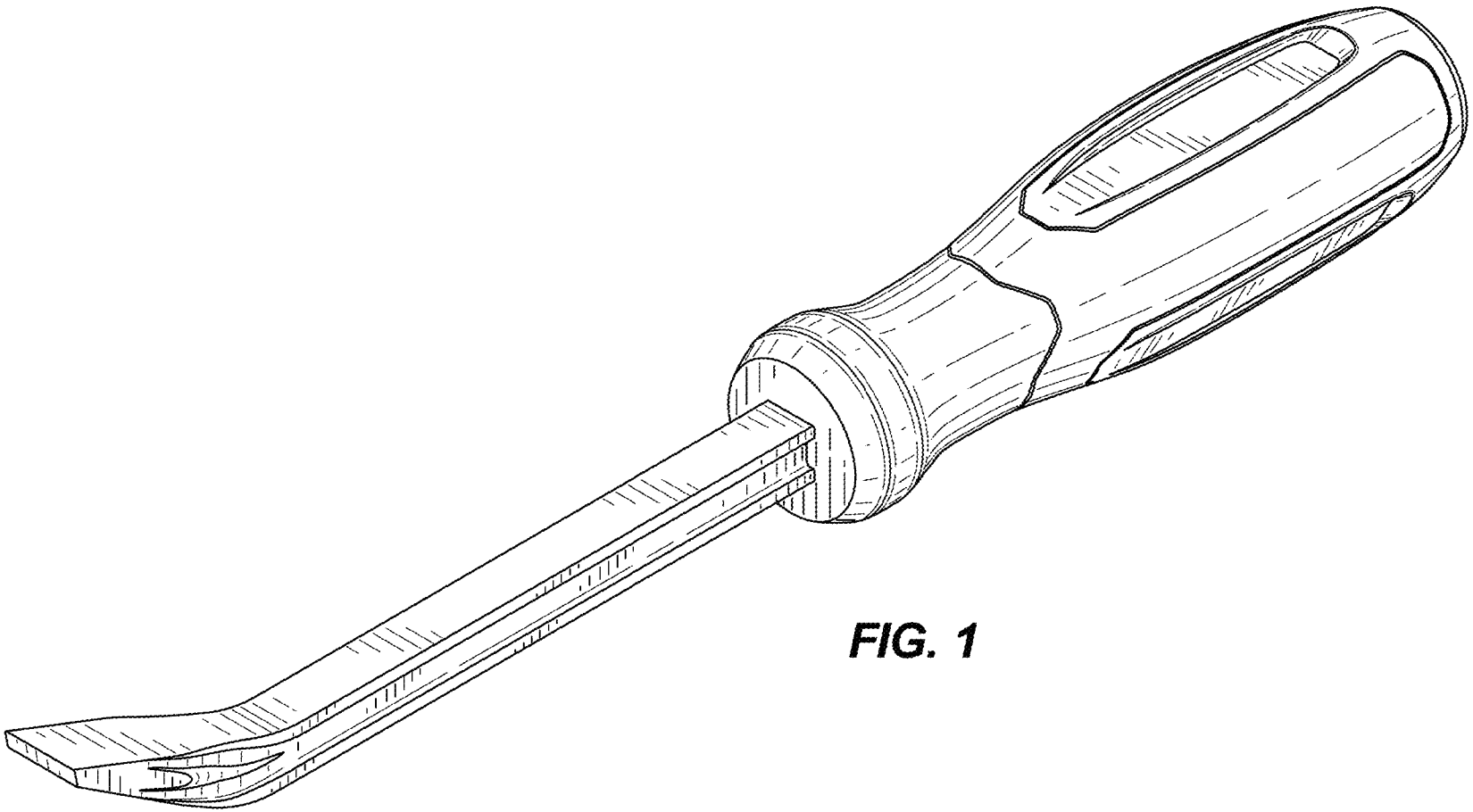
Figure 2:
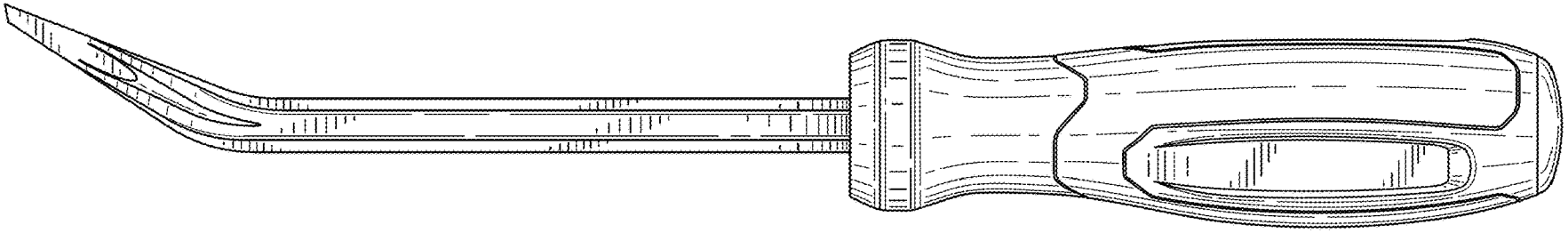
Figure 3:
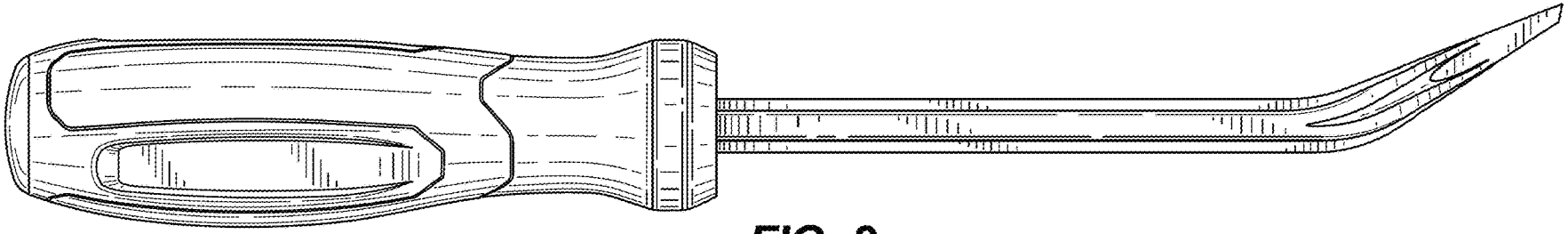
Figure 4:
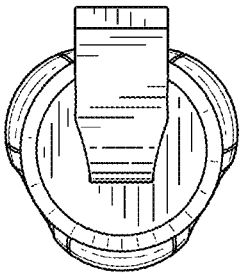
Figure 5:
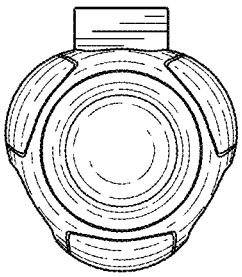
Figure 6:
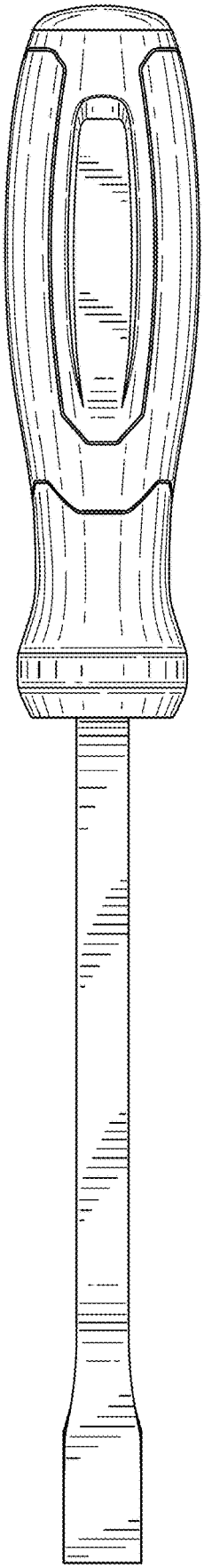
Figure 7:
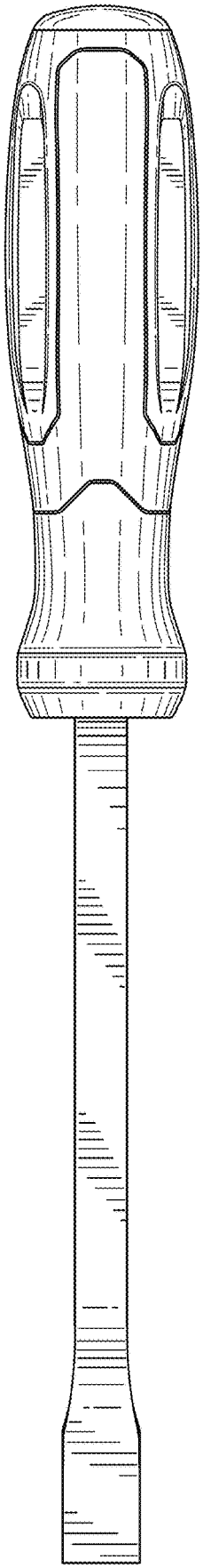

FIG. 1 is a perspective view of a pry bar according to an embodiment of the invention.
FIG. 2 is a first side view of the pry bar shown in FIG. 1.
FIG. 3 is a second side view of the pry bar shown in FIG. 1.
FIG. 4 is a first end view of the pry bar shown in FIG. 1.
FIG. 5 is a second end view of the pry bar shown in FIG. 1.
FIG. 6 is a third side view of the pry bar shown in FIG. 1.
FIG. 7 is a fourth side view of the pry bar shown in FIG. 1.
*FIG. 8 is a perspective view of a pry bar according to another embodiment of the invention.*
*FIG. 9 is a first side view of the pry bar shown in FIG. 8.*
*FIG. 10 is a second side view of the pry bar shown in FIG. 8.*
*FIG. 11 is a first end view of the pry bar shown in FIG. 8.*
*FIG. 12 is a second end view of the pry bar shown in FIG. 8.*
*FIG. 13 is a third side view of the pry bar shown in FIG. 8; and,*
*FIG. 14 is a fourth side view of the pry bar shown in FIG. 8.*
*The broken lines depict portions of the pry bar in which the design is embodied that are not considered part of the claimed design. Any broken lines having unequal line segments indicate the boundary of the claimed design.*

1 Claim, 8 Drawing Sheets

Matter enclosed in heavy brackets [ ] appears in the original patent but forms no part of this reissue; matter printed in italics indicates the additions made by reissue.

(58) Field of Classification Search
CPC .. B25G 1/105; B25G 1/00; B25G 1/10; Y10T 16/476; B25B 33/00; B25C 11/00
See application file for complete search history.

(56) References Cited

U.S. PATENT DOCUMENTS

| | | | | |
|---|---|---|---|---|
| D202,687 | S | 10/1965 | Estwing | |
| 3,772,994 | A | 11/1973 | Juarbe | |
| 4,287,623 | A | 9/1981 | Tarran | |
| D344,665 | S * | 3/1994 | Baker | D8/88 |
| D355,103 | S * | 2/1995 | Bartlett | D8/14 |
| 5,495,651 | A * | 3/1996 | Tsuha | B25B 27/02 254/25 |
| D397,015 | S * | 8/1998 | Hall | D8/14 |
| 6,308,934 | B1 | 10/2001 | Gallo | |
| 6,471,186 | B1 * | 10/2002 | Lawless | B25C 11/00 254/25 |
| D465,389 | S * | 11/2002 | Norton | D8/14 |
| 6,513,788 | B1 | 2/2003 | Ashe | |
| 6,598,857 | B1 | 7/2003 | Hernandez et al. | |
| 6,663,082 | B1 * | 12/2003 | Ploeger | B25C 11/00 254/129 |
| 6,752,380 | B1 | 6/2004 | Taylor et al. | |
| D493,086 | S | 7/2004 | Taylor et al. | |
| 6,772,994 | B1 * | 8/2004 | Lawless | B25B 33/00 254/25 |
| 6,959,917 | B2 | 11/2005 | Hernandez et al. | |
| 7,048,255 | B2 * | 5/2006 | Buch | B25C 11/00 254/25 |
| D542,620 | S * | 5/2007 | Thompson | D8/107 |
| D553,823 | S * | 10/2007 | Liu | D34/23 |
| 7,293,331 | B2 | 11/2007 | Lawless | |
| 7,523,525 | B2 * | 4/2009 | Lawless | B25B 33/00 16/430 |
| D593,835 | S * | 6/2009 | Good | D8/89 |
| 7,574,776 | B2 | 8/2009 | Lawless | |
| D642,887 | S * | 8/2011 | Good | D8/83 |
| 8,032,991 | B2 * | 10/2011 | Lawless | B25G 1/105 16/430 |
| D671,813 | S * | 12/2012 | Lin | D8/83 |
| 10,071,471 | B2 * | 9/2018 | Lawless | B25B 15/02 |
| 10,195,733 | B2 * | 2/2019 | Jannitto, Jr. | B25G 1/005 |
| 2008/0072713 | A1 | 3/2008 | Chen | |
| 2008/0072714 | A1 | 3/2008 | Chen | |
| 2011/0315326 | A1 | 12/2011 | Jouve et al. | |

* cited by examiner

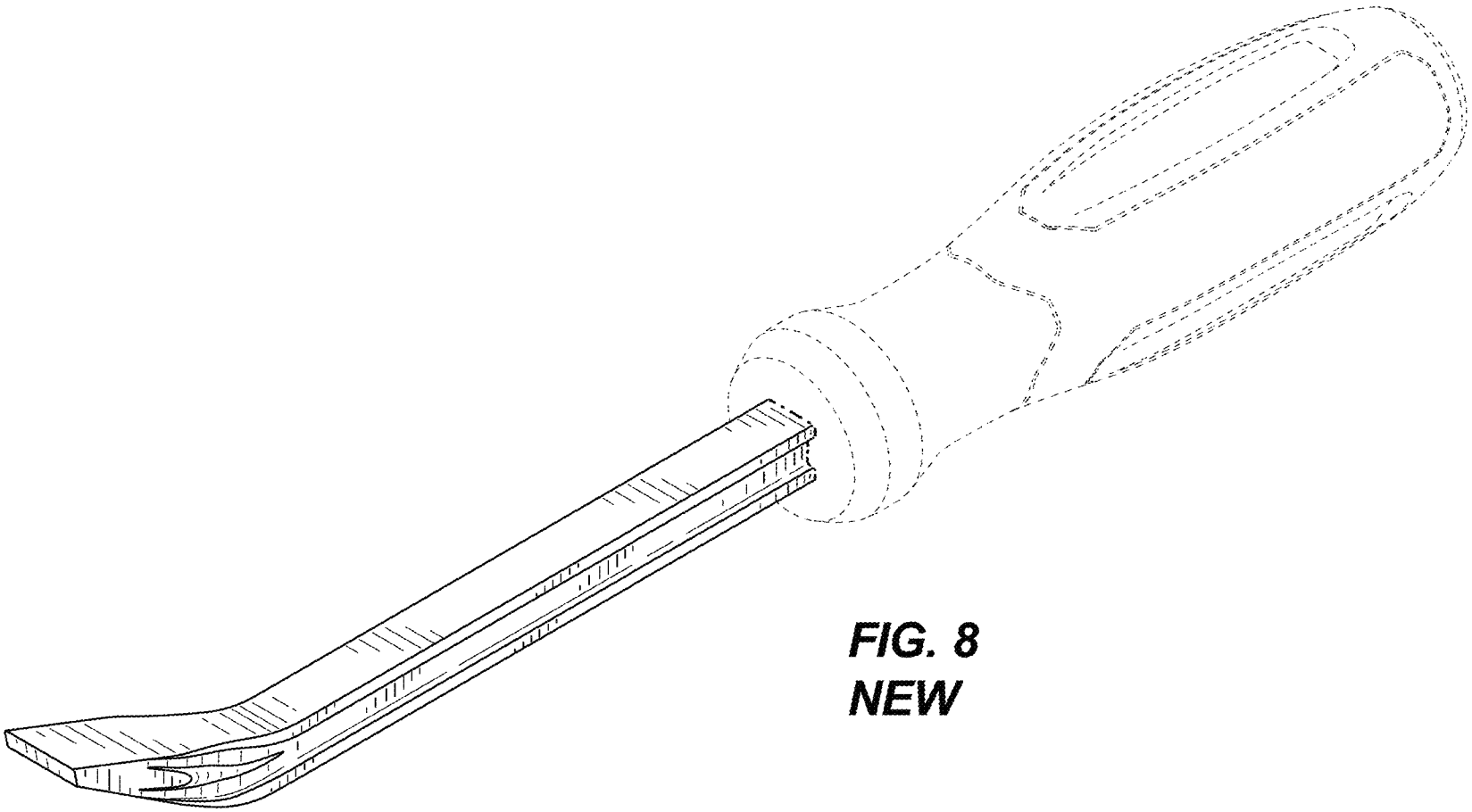
FIG. 8
NEW

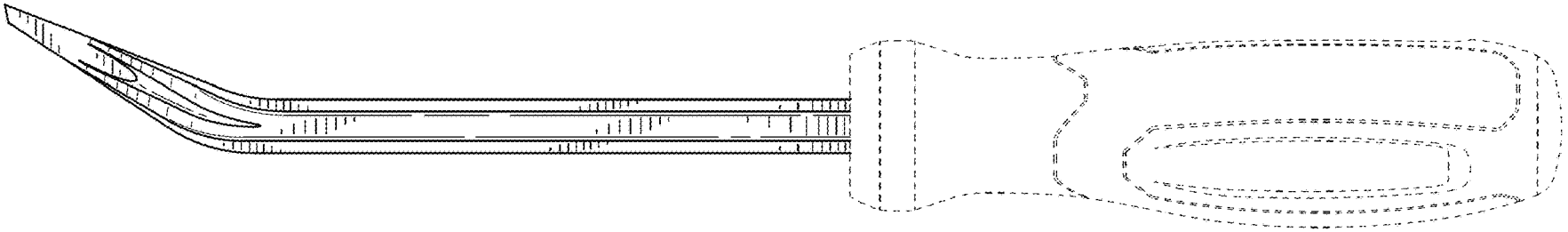
FIG. 9
NEW
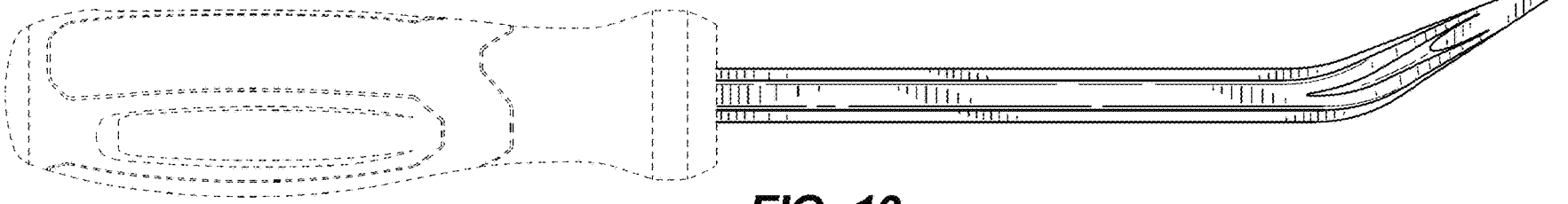
FIG. 10
NEW

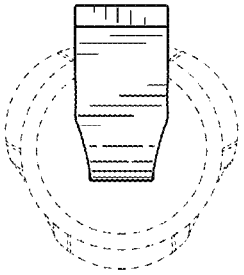
FIG. 11
NEW
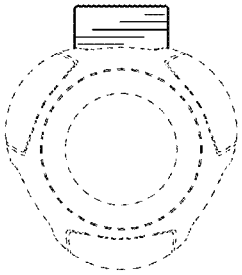
FIG. 12
NEW

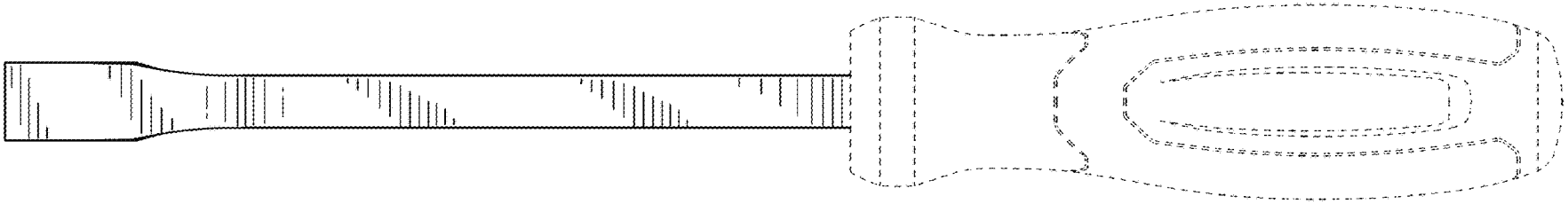
FIG. 13
NEW
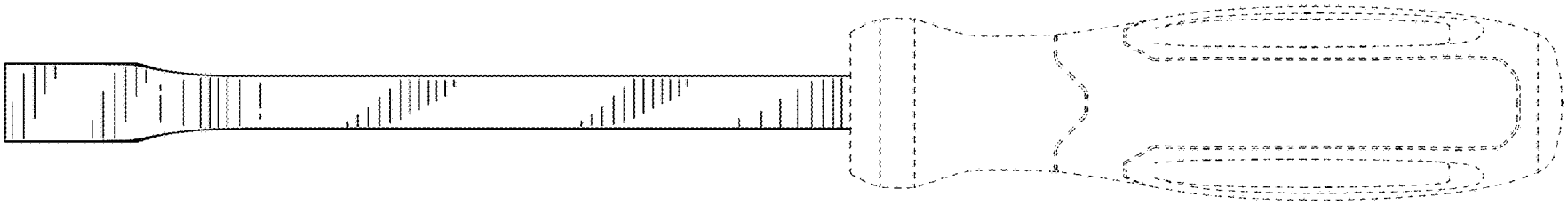
FIG. 14
NEW